United States Patent
Heertjes et al.

(10) Patent No.: US 7,774,287 B2
(45) Date of Patent: Aug. 10, 2010

(54) SYSTEM AND METHOD FOR MOVING A COMPONENT THROUGH A SETPOINT PROFILE, LITHOGRAPHIC APPARATUS AND DEVICE MANUFACTURING METHOD

(75) Inventors: Marcel François Heertjes, Best (NL); Yin-Tim Tso, Eindhoven (NL); Edwin Teunis Van Donkelaar, Den Haag (NL)

(73) Assignee: ASML Netherlands B.V., Veldhoven (NL)

( * ) Notice: Subject to any disclaimer, the term of this patent is extended or adjusted under 35 U.S.C. 154(b) by 700 days.

(21) Appl. No.: 11/374,416

(22) Filed: Mar. 14, 2006

(65) Prior Publication Data
US 2007/0219647 A1  Sep. 20, 2007

(51) Int. Cl.
G06F 15/00 (2006.01)
G06F 17/00 (2006.01)

(52) U.S. Cl. ............................ 706/44; 700/121; 355/53
(58) Field of Classification Search .................. 700/44, 700/95; 101/484; 355/53, 72
See application file for complete search history.

(56) References Cited
U.S. PATENT DOCUMENTS
7,468,782 B2 * 12/2008 Butler ........................ 355/75
2005/0043834 A1 * 2/2005 Rotariu et al. ................ 700/95
2006/0119829 A1 * 6/2006 Cox et al. ..................... 355/72
2006/0221320 A1 * 10/2006 Bleeker et al. ................ 355/67

* cited by examiner

Primary Examiner—Donald Sparks
Assistant Examiner—Kalpana Bharawaj
(74) Attorney, Agent, or Firm—Pillsbury Winthrop Shaw Pittman LLP

(57) ABSTRACT

A system to move a component in accordance with a setpoint profile including a plurality of target states of the component, each of the plurality of target states to be substantially attained at one of a corresponding sequence of target times, is presented. The system includes a displacement device to move the component according to the setpoint profile; a storage device containing a library of feedforward data; a signal generating part configured to identify a plurality of time segments of the setpoint profile that correspond to entries in the library of feedforward data, and access the entries in order to construct a feedforward signal; and a feedforward control system to control the operation of the displacement device by reference to the feedforward signal constructed by the signal generating part.

14 Claims, 7 Drawing Sheets

SYSTEM AND METHOD FOR MOVING A COMPONENT THROUGH A SETPOINT PROFILE, LITHOGRAPHIC APPARATUS AND DEVICE MANUFACTURING METHOD

FIELD

The present invention relates to a system for moving a component through a setpoint profile and a lithographic apparatus including such a system. The invention further relates to a method for moving a component through a setpoint profile and a device manufacturing method including such a method.

BACKGROUND

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, may be used to generate a circuit pattern to be formed on an individual layer of the IC. This pattern can be transferred onto a target portion (e.g. including part of, one, or several dies) on a substrate (e.g. a silicon wafer). Transfer of the pattern is typically via imaging onto a layer of radiation-sensitive material (resist) provided on the substrate. In general, a single substrate will contain a network of adjacent target portions that are successively patterned. Known lithographic apparatus include so-called steppers, in which each target portion is irradiated by exposing an entire pattern onto the target portion at once, and so-called scanners, in which each target portion is irradiated by scanning the pattern through a radiation beam in a given direction (the "scanning"-direction) while synchronously scanning the substrate parallel or anti-parallel to this direction. It is also possible to transfer the pattern from the patterning device to the substrate by imprinting the pattern onto the substrate.

In order to ensure good performance of the lithographic apparatus, it is desirable to control the precision with which components to be moved during exposure, such as the reticle stage (patterning device table) containing the patterns needed for illumination and the substrate table containing the substrates to be illuminated, can be displaced. Under feedback control, the movement of components is controlled using standard PID-based control systems. However, to obtain nano-scale position accuracy, with settling times of the order of milliseconds or lower, feedforward control may be necessary.

In addition to the commonly used acceleration-, jerk-, and even snap-based feedforward control designs (i.e. designs based on acceleration and higher order derivatives of position with respect to time), the application of iterative learning control as a means for obtaining short settling times has been suggested. This approach has the benefit that only limited system knowledge is required to implement the feedforward control with high accuracy. The method is based on iteratively learning a feedforward signal or "force" by reference to a measured error signal (defined as a measured deviation of the state of a component being moved from a setpoint profile defining an intended time evolution of the state) of sufficient duration to allow a degree of convergence. When the learned signal is applied to the system or process it effectively counteracts the repetitive contributions to the error signal. The learned signal, which may be stored in a table for example, corresponds to the particular setpoint profile used for the learning.

Even for a given type of scanning in a lithography apparatus, the setpoint profile is likely to vary as die lengths and/or exposure velocities are varied. Where many different profiles are needed, it is desirable to learn and store many different feedforward tables. The situation is not restricted to feedforward data derived from iterative learning, but will occur whenever feedforward data is dependent on the setpoint profile.

SUMMARY

It is desirable to provide an improved system for dealing with setpoint profile dependent feedforward data.

According to an embodiment of the invention, there is provided a system for moving a component through a setpoint profile including a plurality of target states of the component, each to be substantially attained at one of a corresponding sequence of target times, the system including: a displacement device for moving the component according to the setpoint profile; a storage device (or data storage device) containing a library of feedforward data; a signal generating part (or signal generator) configured to identify a plurality of time segments of the setpoint profile that correspond to entries in the library of feedforward data, and access the entries in order to construct a feedforward signal; and a feedforward control system for controlling the operation of the displacement device by reference to the feedforward signal constructed by the signal generating part.

According to a further embodiment of the invention, there is provided a lithographic projection apparatus arranged to project a pattern from a patterning device onto a substrate, including: a movable support for the patterning device; and a system for moving the movable support through a setpoint profile including a plurality of target states of the movable support, each to be substantially attained at one of a corresponding sequence of target times, the system including: a displacement device for moving the movable support according to the setpoint profile; a storage device containing a library of feedforward data; a signal generating part configured to identify a plurality of time segments of the setpoint profile that correspond to entries in the library of feedforward data, and access the entries in order to construct a feedforward signal; and a feedforward control system for controlling the operation of the displacement device by reference to the feedforward signal constructed by the signal generating part.

According to a further embodiment of the invention, there is provided a lithographic projection apparatus arranged to project a pattern from a patterning device onto a substrate, including: a movable support for the substrate; and a system for moving the movable support through a setpoint profile including a plurality of target states of the movable support, each to be substantially attained at one of a corresponding sequence of target times, the system including: a displacement device for moving the movable support according to the setpoint profile; a storage device containing a library of feedforward data; a signal generating part configured to identify a plurality of time segments of the setpoint profile that correspond to entries in the library of feedforward data, and access the entries in order to construct a feedforward signal; and a feedforward control system for controlling the operation of the displacement device by reference to the feedforward signal constructed by the signal generating part.

According to a further embodiment of the invention, there is provided a method of moving a component through a setpoint profile including a plurality of target states of the component, each to be substantially attained at one of a corresponding sequence of target times, the method including:

comparing a plurality of time segments of the setpoint profile with entries in a library of feedforward data and identifying time segments for which feedforward data exists in the library; retrieving feedforward data for time segments thus identified and constructing at least part of a feedforward signal using the retrieved feedforward data; using the feedforward signal to control the movement of the component according to the setpoint profile.

According to a further embodiment of the invention, there is provided a device manufacturing method including projecting a pattern from a patterning device onto a substrate, including: providing a movable support for the patterning device; and moving the movable support through a setpoint profile comprising a plurality of target states of the movable support, each to be substantially attained at one of a corresponding sequence of target times, the method including: comparing a plurality of time segments of the setpoint profile with entries in a library of feedforward data and identifying time segments for which feedforward data exists in the library; retrieving feedforward data for time segments thus identified and constructing at least part of a feedforward signal using the retrieved feedforward data; using the feedforward signal to control the movement of the movable support according to the setpoint profile.

According to a further embodiment of the invention, there is provided a device manufacturing method including projecting a pattern from a patterning device onto a substrate, including: providing a movable support for the substrate; and moving the movable support through a setpoint profile comprising a plurality of target states of the movable support, each to be substantially attained at one of a corresponding sequence of target times, the method including: comparing a plurality of time segments of the setpoint profile with entries in a library of feedforward data and identifying time segments for which feedforward data exists in the library; retrieving feedforward data for time segments thus identified and constructing at least part of a feedforward signal using the retrieved feedforward data; using the feedforward signal to control the movement of the movable support according to the setpoint profile.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
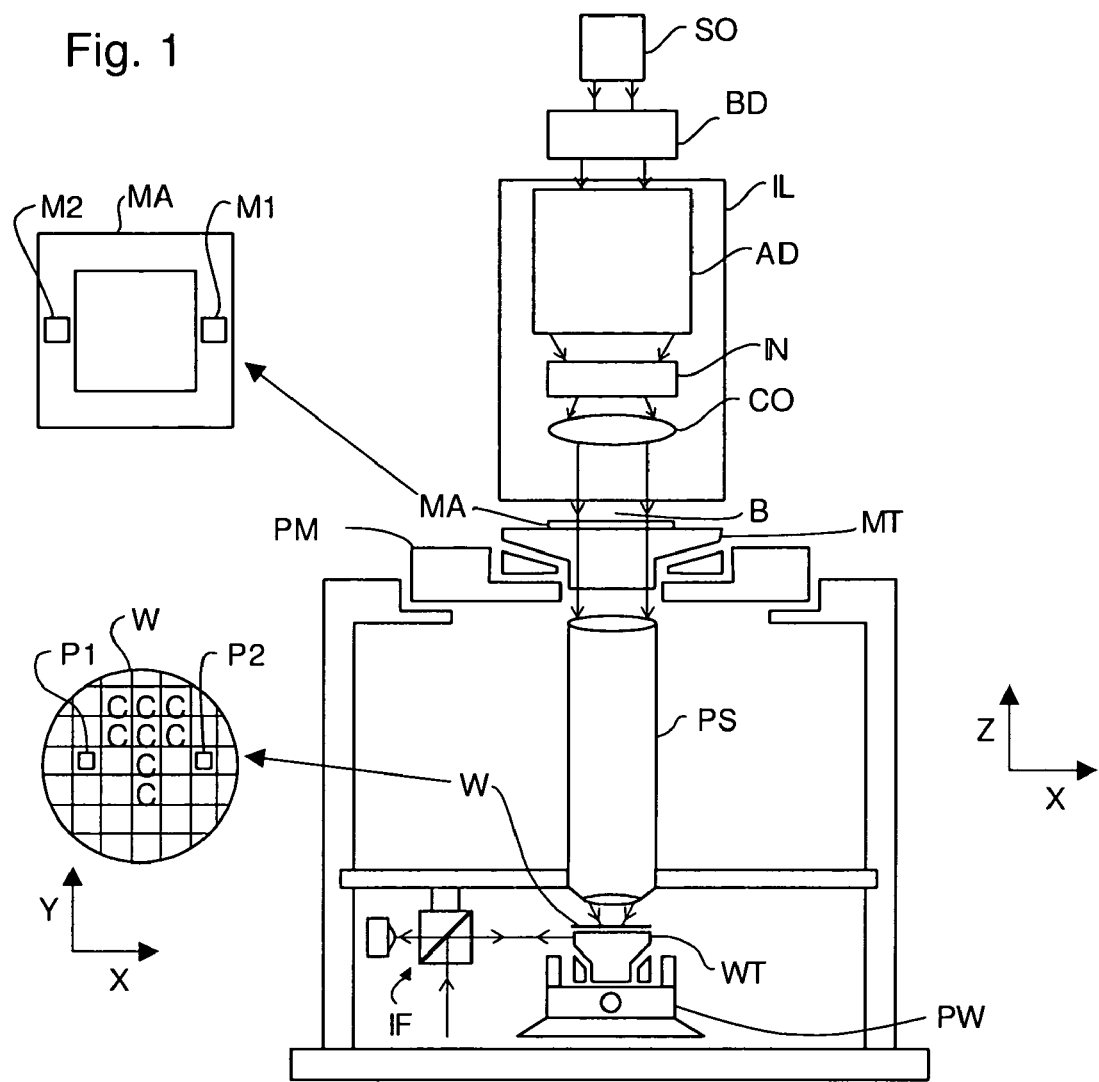
FIG. 1 depicts a lithographic apparatus according to an embodiment of the invention.

FIG. 1 schematically depicts a lithographic apparatus according to one embodiment of the invention. The apparatus includes an illumination system (illuminator) IL configured to condition a radiation beam B (e.g. UV radiation or EUV radiation); a support structure (e.g. a mask table) MT constructed to support a patterning device (e.g. a mask) MA and connected to a first positioner PM configured to accurately position the patterning device in accordance with certain parameters; a substrate table (e.g. a wafer table) WT constructed to hold a substrate (e.g. a resist-coated wafer) W and connected to a second positioner PW configured to accurately position the substrate in accordance with certain parameters; and a projection system (e.g. a refractive projection lens system) PS configured to project a pattern imparted to the radiation beam B by patterning device MA onto a target portion C (e.g. including one or more dies) of the substrate W.

The illumination system may include various types of optical components, such as refractive, reflective, magnetic, electromagnetic, electrostatic or other types of optical components, or any combination thereof, for directing, shaping, or controlling radiation.

The support structure supports, i.e. bears the weight of, the patterning device. It holds the patterning device in a manner that depends on the orientation of the patterning device, the design of the lithographic apparatus, and other conditions, such as for example whether or not the patterning device is held in a vacuum environment. The support structure can use mechanical, vacuum, electrostatic or other clamping techniques to hold the patterning device. The support structure may be a frame or a table, for example, which may be fixed or movable as required. The support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a radiation beam with a pattern in its cross-section such as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

As here depicted, the apparatus is of a transmissive type (e.g. employing a transmissive mask). Alternatively, the apparatus may be of a reflective type (e.g. employing a programmable mirror array of a type as referred to above, or employing a reflective mask).

The lithographic apparatus may be of a type having two (dual stage) or more substrate tables (and/or two or more mask tables). In such "multiple stage" machines the additional tables may be used in parallel, or preparatory steps may be carried out on one or more tables while one or more other tables are being used for exposure.

The lithographic apparatus may also be of a type wherein at least a portion of the substrate may be covered by a liquid having a relatively high refractive index, e.g. water, so as to fill a space between the projection system and the substrate. An immersion liquid may also be applied to other spaces in the lithographic apparatus, for example, between the mask and the projection system. Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

Referring to FIG. 1, the illuminator IL receives a radiation beam from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD including, for example, suitable directing mirrors and/or a beam expander. In other cases the source may be an integral part of the lithographic apparatus, for example when the source is a mercury lamp. The source SO and the illuminator IL, together with the beam delivery system BD if required, may be referred to as a radiation system.

The illuminator IL may include an adjuster AD for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may include various other components, such as an integrator IN and a condenser CO. The illuminator may be used to condition the radiation beam, to have a desired uniformity and intensity distribution in its cross-section.

The radiation beam B is incident on the patterning device (e.g., mask MA), which is held on the support structure (e.g., mask table MT), and is patterned by the patterning device. Having traversed the mask MA, the radiation beam B passes through the projection system PS, which focuses the beam onto a target portion C of the substrate W. With the aid of the second positioner PW and position sensor IF (e.g. an interferometric device, linear encoder or capacitive sensor), the substrate table WT can be moved accurately, e.g. so as to position different target portions C in the path of the radiation beam B. Similarly, the first positioner PM and another position sensor (which is not explicitly depicted in FIG. 1) can be used to accurately position the mask MA with respect to the path of the radiation beam B, e.g. after mechanical retrieval from a mask library, or during a scan. In general, movement of the mask table MT may be realized with the aid of a long-stroke module (coarse positioning) and a short-stroke module (fine positioning), which form part of the first positioner PM. Similarly, movement of the substrate table WT may be realized using a long-stroke module and a short-stroke module, which form part of the second positioner PW. In the case of a stepper (as opposed to a scanner) the mask table MT may be connected to a short-stroke actuator only, or may be fixed. Mask MA and substrate W may be aligned using mask alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the mask MA, the mask alignment marks may be located between the dies.

The depicted apparatus could be used in at least one of the following modes:

1. In step mode, the mask table MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed. In step mode, the maximum size of the exposure field limits the size of the target portion C imaged in a single static exposure.

2. In scan mode, the mask table MT and the substrate table WT are scanned synchronously while a pattern imparted to the radiation beam is projected onto a target portion C (i.e. a single dynamic exposure). The velocity and direction of the substrate table WT relative to the mask table MT may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the mask table MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

Figure 2A:
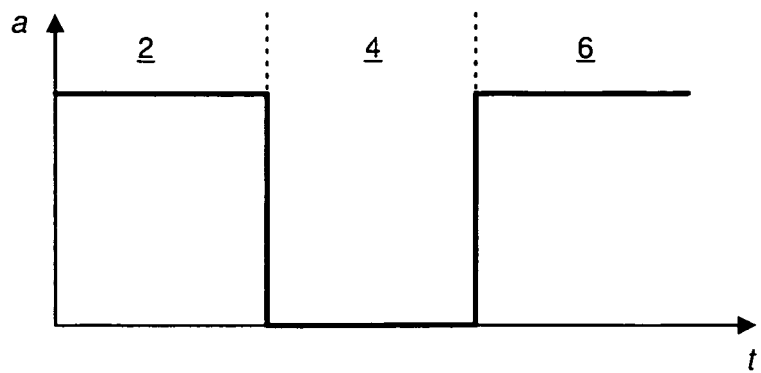
FIGS. 2a-c depict a setpoint profile defined in terms of an acceleration profile, a velocity profile and a position profile.
Figure 2B:
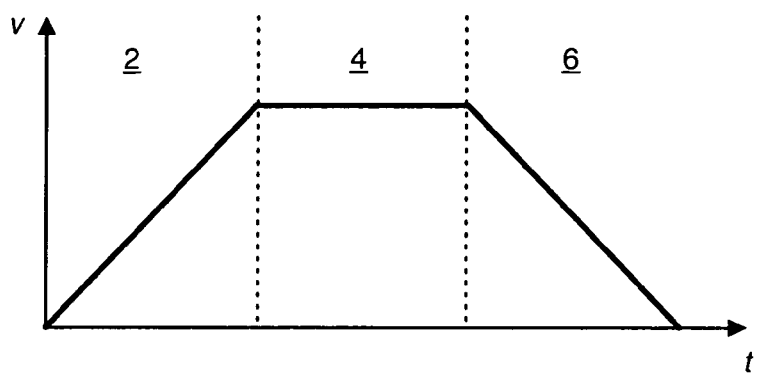
Figure 2C:
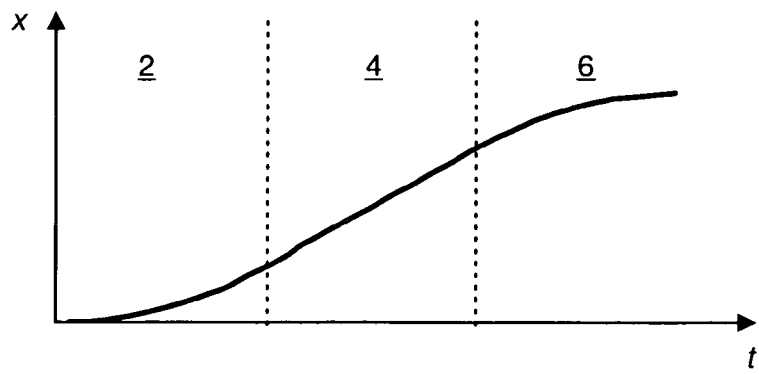

FIG. 2 illustrates what is meant by a setpoint profile. Three schematic graphs are shown representing (from top to bottom) the acceleration (FIG. 2a), velocity (FIG. 2b) and position (FIG. 2c) of a component while it is being moved through a simplified setpoint profile. The setpoint profile, in this example, includes three distinct regimes: an acceleration phase 2, a constant velocity phase 4, and a deceleration phase 6. In general, the setpoint profile may be characterized by a sequence of target states that the component is intended to reach at particular target times.

As mentioned above, accurate control of components to be moved may be achieved using a feedforward control system. The feedforward signal in such systems may be based either on explicit system knowledge (based on factors such as the mass of the component to be moved) or on feedforward data derived from previous measurements (for example, an iterative learning scheme may be employed). Feedforward data of the latter type is often dependent on the particular setpoint profile that is currently being used, a different set being needed if the setpoint profile is changed. Where many different setpoint profiles are envisaged, a large amount of feedforward data may have to be stored and many prior measurements may have to be carried out in order to derive (or "learn") all of the desired feedforward data.

According to an embodiment of the invention, it is possible to cope with a large number of setpoint profiles using only a limited amount of feedforward data. This is achieved by using a switched feedforward data strategy by which feedforward data for a given setpoint profile is built up from segments of feedforward data extracted from a library of feedforward data. This approach is based on the realization that in many practical situations different applied acceleration profiles (setpoint profiles) have a number of features in common: for example, constant acceleration/deceleration phases (for fixed velocities) or constant jerk/djerk phase (a "jerk" phase refers to a period of constant rate of increase of acceleration and a "djerk" phase corresponds to a period of constant rate of decrease of acceleration). Due to the fact that the setpoints (to achieve maximum throughput) often apply maximum jerk and acceleration levels, the slope of the acceleration/deceleration phases are more or less fixed for a given hardware setup, hence so is the time needed to reach the steady-state acceleration level. A user of the lithography apparatus using this technology may need different velocities according to the particular process steps being performed but maximum acceleration and jerk may still be applied for a significant range of velocities. For very low velocity processes, where throughput may be less important, the acceleration and/or jerk may be scaled down. Differences between setpoint profiles, such as in the length of the constant velocity phase, can be considered as different compositions of these generic features.

An embodiment is described below where only two blocks of feedforward data are derived and subsequently stored: one containing an acceleration phase and one containing a deceleration phase of a setpoint profile. Using only these two blocks of feedforward data, it is shown that a number of setpoint profiles with smaller constant velocity lengths can efficiently be handled. In another embodiment, we consider the jerk phase and part of the constant velocity phase along with the djerk phase and an equal part of the corresponding constant velocity phase. A wide range of other setpoint profiles may be dealt with an analogous way.

Figure 3:
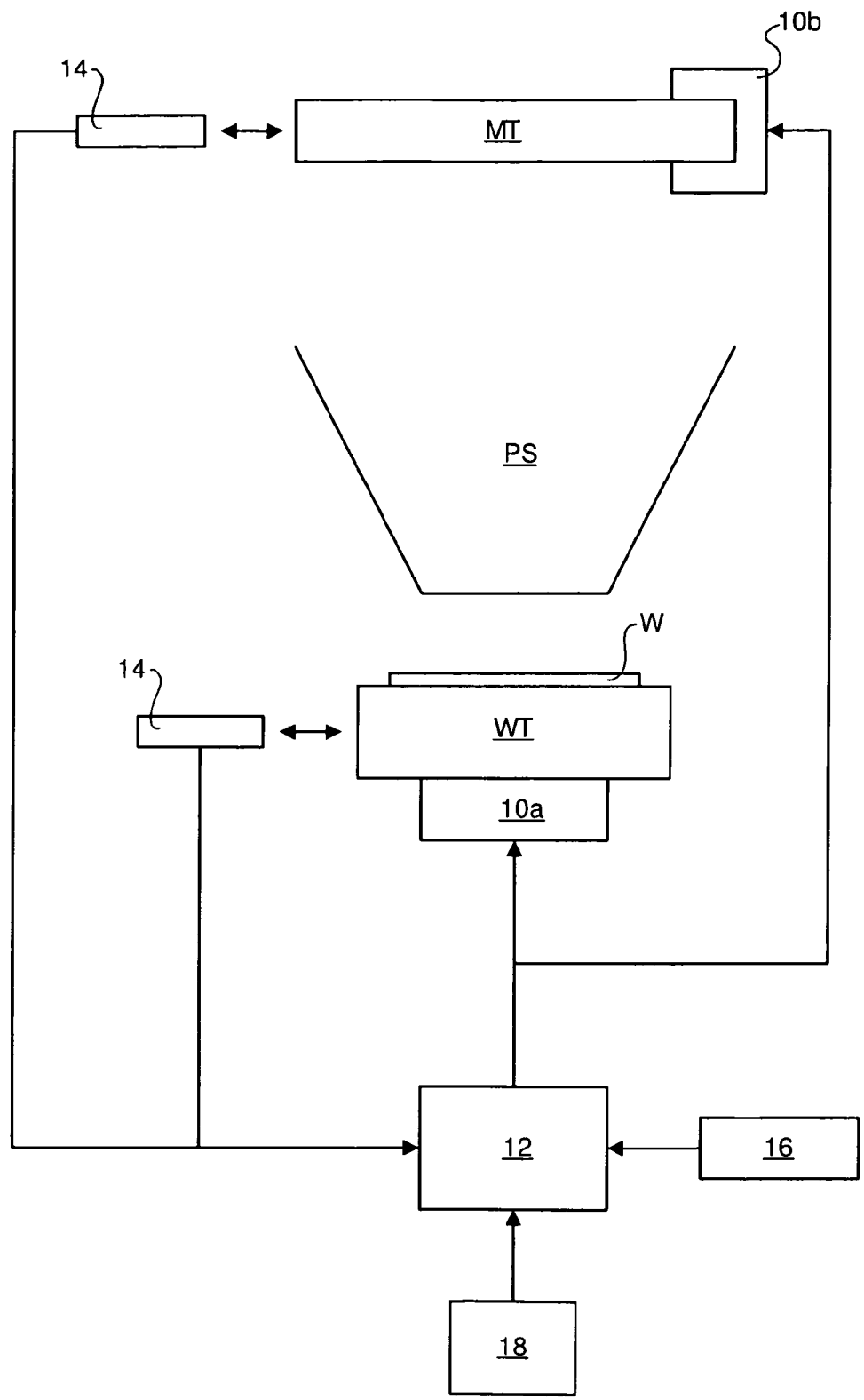
FIG. 3 discloses a lithography apparatus with a signal generating part and feedforward control system according to an embodiment of the invention.

FIG. 3 illustrates an embodiment of the invention as applied to a lithography apparatus. According to this arrangement, a substrate table WT and/or a patterning device table MT are/is arranged to be moved through a setpoint profile. A displacement device 10a or 10b is provided for moving the substrate table WT or patterning device table MT respectively under the control of a control signal provided by a feedforward control system 12. The setpoint profile is input via device 18, which may be an input device such as an external computer, or a storage device. On the basis of: i) the setpoint profile, which may consist of a plurality of target states (positions, velocities and/or accelerations, for example) for the substrate table WT and/or patterning device table MT to be moved through in a corresponding sequence of target times; ii) feedforward data provided by a storage device 16; and iii) substrate table and/or patterning device table state data (e.g. position, velocity and/or acceleration) provided by a measuring device 14, the control signal provided to the displacement device from the feedforward control system is adapted to achieve the desired movement. As mentioned above, the feedforward data used by the feedforward control system 12 may include two components: a component based on system specific knowledge, which in general is independent of the particular setpoint profile, and a component that is dependent on the setpoint profile, typically derived from prior measurements, such as iteratively learned data.

According to this embodiment, the feedforward control system 12 includes a signal generating part (or signal generator) that is configured to identify time segments of the setpoint profile that correspond to entries in a library of feedforward data stored in the storage device 16. When such a time segment is detected, the correspond entry in the library of feedforward data is extracted and used by the feedforward control system to derive a control signal for the displacement device 10a/10b that corresponds to the same segment of the setpoint profile. For example, referring to the setpoint profile illustrated in FIG. 2, the storage device 16 may be arranged to contain a library entry of feedforward data for the time segment 2 and for the time segment 6, representing the constant acceleration phase and the constant deceleration phase. During these particular time segments, the feedforward control system will operate based on the corresponding feedforward data segments extracted from the library. The same two library segments may be used effectively as feedforward data for setpoint profiles having a longer or shorter constant velocity segment 4, without having to derive new feedforward data.

Figure 4:
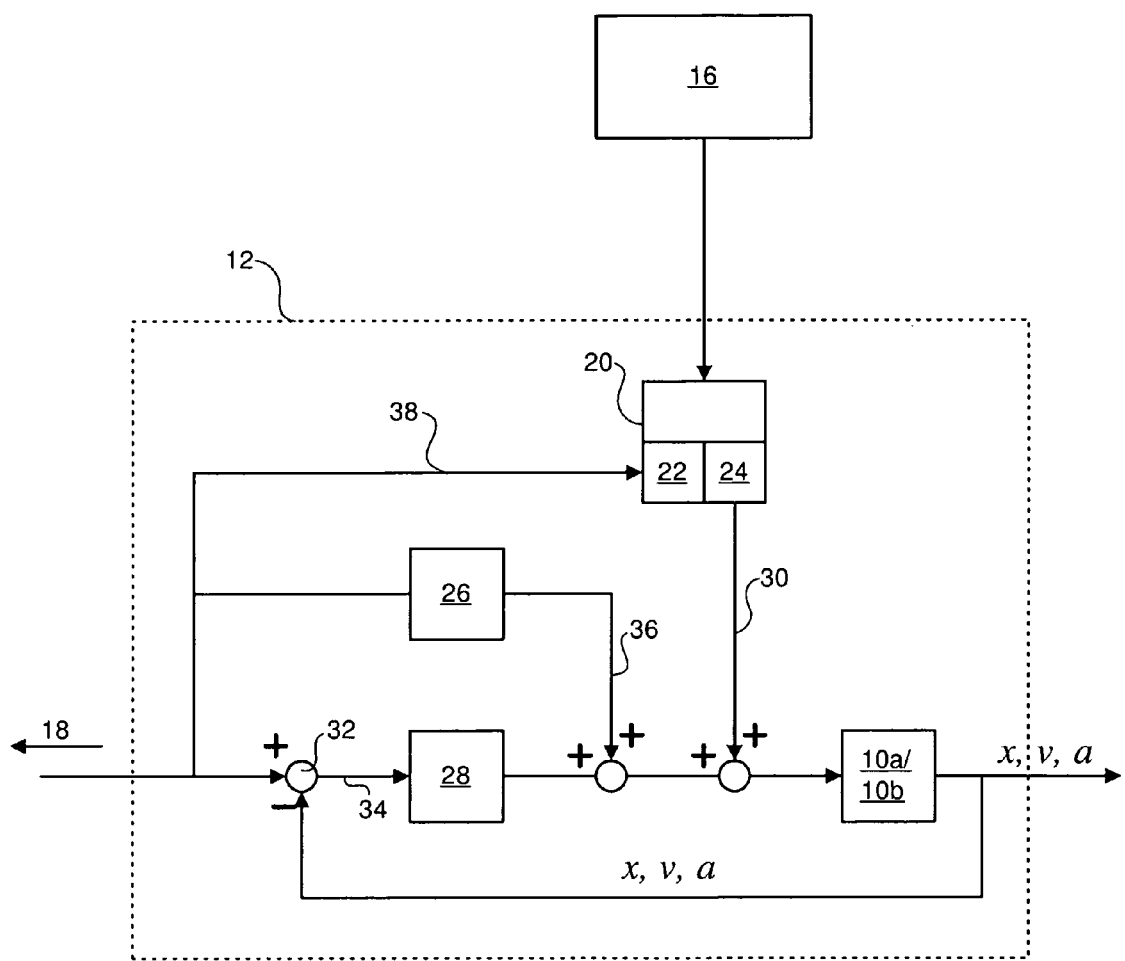
FIG. 4 depicts a storage device, signal generating part and feedforward control system according to an embodiment of the invention.

FIG. 4 illustrates in more detail how the feedforward control system 12 may be configured to operate. According to this embodiment, a signal generating part (or signal generator) 20 is provided that receives input 38 including the setpoint profile from the setpoint profile device 18 and is connected to the storage device 16 containing the library of feedforward data. The signal generating part (or signal generator) 20 includes a trigger detection system 22, which detects segments of the setpoint profile that correspond to entries in the library of feedforward data. This operation may be carried out based on recognition of characteristic shapes of setpoint profile segments, for example, or may operate by recognizing triggers that have been deliberated inserted in the setpoint profile, for example identifying the start of a segment of the setpoint profile for which it is intended to store a corresponding entry in the library of feedforward data. For example, two feedforward tables, I and II, may be used that are triggered in the sequence I, −I, II, −II by acceleration trigger points in the setpoint profile. More generally, where the setpoint profile is defined relative to a time axis, any point on the time axis may be made available as a potential trigger. An input device 24 is provided that is configured to insert entries from the library into a feedforward signal 30 when a corresponding segment is detected by the trigger detection system 22. Where a given setpoint profile can be built up entirely from elements contained in the library of feedforward data, the feedforward signal 30 may be input substantially continuously during processing of the setpoint profile by the feedforward control system 12. Otherwise, the feedforward signal 30 will be supplied intermittently.

The remaining aspects of the control scheme are as follows. At point 32, a setpoint profile signal from the setpoint profile device 18 is compared with a measured position signal of the component to be moved (in the case of the embodiment of FIG. 3, this signal will be provided by one or both of the measuring devices 14) and an error signal 34 is forwarded to controller 28. This feedback control is desirable to account for non-repetitive disturbances that are always present to some extent. The controller 28 also accounts for any mismatch in the applied setpoint feedforward (if the feedforward signal 30 is perfectly derived then no mismatch will occur— see below). The output from controller 28 is added to a feedforward signal 36 representing, in the present embodiment, an inertial feedforward based on known physical properties of the system in question, such as the mass of the substrate table and associated components, and to a feedforward signal 30 from the signal generating part (or signal generator) 20. The resultant signal is passed to the displacement device 10a/10b which effects a change in the position x, velocity v and/or acceleration a of the component to be moved.

According to an embodiment of the invention, entries in the library of feedforward data stored in the storage device 16 may be derived on the basis of an iterative learning control algorithm based on the error signal 34.

Figure 5:
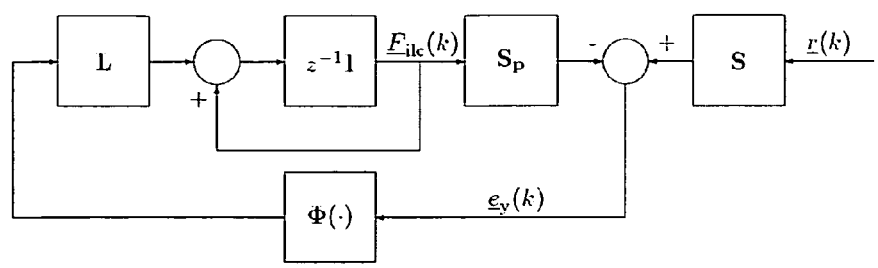
FIG. 5 depicts an iterative learning control algorithm in block diagram representation.
Figure 6:
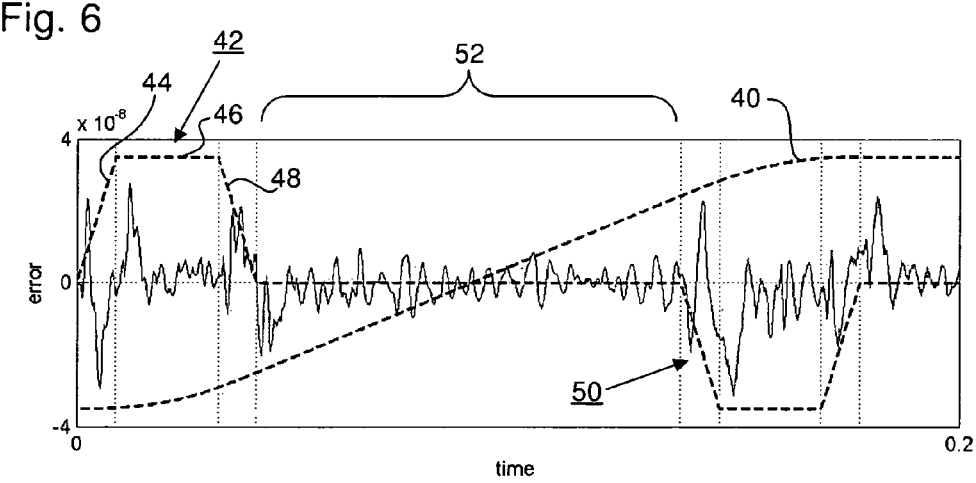
FIG. 6 depicts a setpoint profile and typical corresponding error signal.

The algorithm is shown in block diagram representation in FIG. 5, where, $e_y(k)$ represents an n-sample error colon (an array of data points, which have been sampled at a specific sampling frequency, for example 5 kHz) for the k-th iteration with $e_y(0)=e_{yo}$, Filc(k) represents an n-sample colon of learned control forces with Filc(0)=0, L represents a learning gain matrix (which may be a nonlinear function of the error $e_y(k)$), $z^{-1}$ a one-sample time delay in a z-transform notation, I a unitary matrix, and Sp a so-called Toeplitz matrix representing the closed loop process sensitivity dynamics. Basically, Sp describes the effect of a force on the closed-loop error, L the learning gain, i.e. the gain used to reduce this error, and $z^{-1}I$ is part of an update mechanism needed to update the feedforward signal to be constructed. The algorithm now works as follows. Starting with an array of collected errors during a learning profile, in the first run an array of feedforward forces is computed by multiplying the error array with the learning gain matrix L. In the second run, the same learning profile is applied but now with the first run feedforward forces applied to the system in a synchronized manner. This will, generally, yield smaller errors than before but due to the finite gain constraints of L the errors will not equal zero. Therefore the resulting errors will again be multiplied with L giving an additional array of feedforward forces which will be added to the existing array of feedforward forces. The adapted array of feedforward forces is applied to the system in a third run (again under the same learning profile) and so on. This procedure is repeated run after run under sufficient convergence of either the resulting array of errors or the array of applied feedforward forces According to this embodiment, a reference setpoint profile is chosen which can be decomposed into parts that form the building blocks for other setpoint profiles that need to be handled by the learning design. In the example of FIG. 6, such a reference profile is represented by a forward and backward motion between about −150 mm and about +150 mm. In the Figure, curve 40 represents the position as a function of time. Acceleration is applied as a pulse or hub 42, including a region of constant rate of increase of acceleration 44, a plateau of constant acceleration 46, and a region of constant rate of decrease of acceleration 48. A corresponding negative acceleration pulse 50 causes the velocity to return again to zero at the end of the stroke. For this profile, basically two error regions are remarkable, namely the region 52 during constant positive velocity and the region during constant negative velocity (not shown); in these regions, it is particularly desirable that the errors be kept small. This is particularly the case in lithographic applications, because the constant velocity region is frequently where the optimal quality exposure can be carried out. For the present example, the reference profile is decomposed into these two parts. Each of these parts is subjected to the learning algorithm in order to derive learned feedforward data. Both learned feedforward data segments are stored in separate tables and may be synchronised before subsequently being applied to the system. The feedforward data is synchronized with the acceleration (setpoint) profile exactly in the same way as it is obtained during learning; in general, the corrective forces represented by the generated feedforward data should be matched with the errors that they should compensate for.

Figure 7:
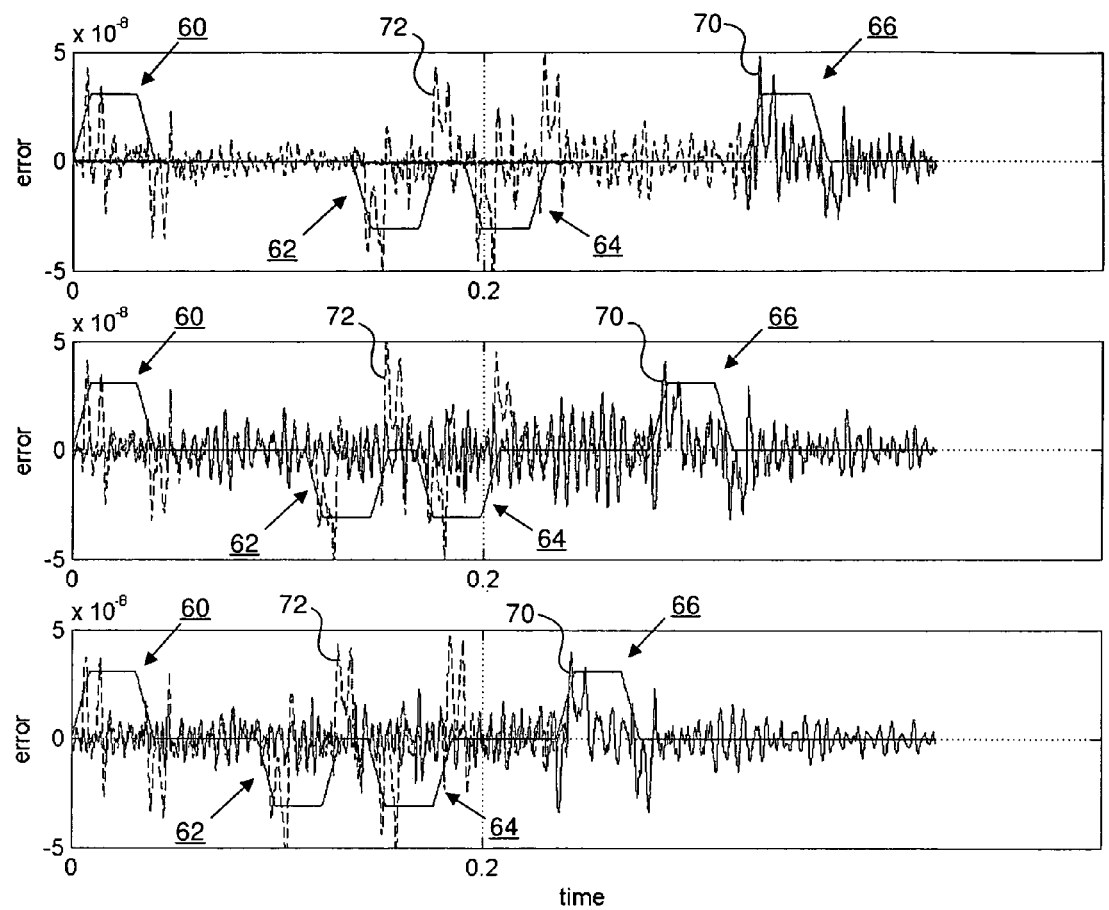
FIG. 7 depicts error signals resulting from a feedforward control system using two learned feedforward tables.

FIG. 7 shows the result of using two learned feedforward data segments: one for the stroke characterized by positive displacement (i.e. from the start of the first positive acceleration hub 60 to the end of the first negative acceleration hub 62) and one for the stroke characterized by negative displacement (i.e. from the start of the second negative acceleration hub 64 to the end of the second positive acceleration hub 66). In the uppermost figure, the learned feedforward data segments are applied on the reference setpoint profile (from about −150 mm to about 150 mm and back to about −150 mm) that was actually used for the learning. It can be seen that up to the first negative acceleration hub 62, the error (continuous line 70) is practically zero as compared to the error before learning (broken line 72). At the start of the second negative acceleration hub 64, i.e. at the transition between the two different feedforward data segments, a small transition phenomenon is recognised. Beyond this phenomenon, the error remains practically zero until the point where the learned force is no longer applied, i.e. at the start of the last acceleration hub 66.

In the middle graph of FIG. 7, the two learned feedforward data segments are partly applied on the first trial profile, i.e. a shorter profile between about −125 mm and about 125 mm. It can be seen by the difference between the error using the learned data derived from the reference setpoint profile (continuous line 70) and the error before learning (broken line 72) that a significant improvement can be obtained in settling times. That is, the large peaks in the error signal induced by the non-smooth transitions in the acceleration profile are removed after applying a learned signal constructed from two different feedforward data segments corresponding to a different profile. Note that the transition phenomenon can no longer be recognized for the noise in the error signal. In fact, by choosing the transition between the different learning tables at the rather arbitrary point of a deceleration hub, the transition phenomenon, in principle, occurs in that part of the acceleration profile that is not directly related to achieving performance in lithography systems (this is because it is generally the case that imaging is carried out during the regions of constant velocity on the positive or negative stroke; where this is the case, it does not matter if the error deteriorates during phases of acceleration, deceleration or changes of direction as long as the error during the constant velocity phase is improved). For this reason, it may be desirable to avoid locations for the transition near the start of the region of constant velocity. In the lowermost graph of FIG. 7, the ability to deal with setpoint variations using a library of multiple feedforward data segments is shown for a second trial profile between about −100 mm and about 100 mm. It is concluded that setpoint variations can be handled effectively under the assumption that the reference profiles share common features which can be learned separately.

Figure 8:
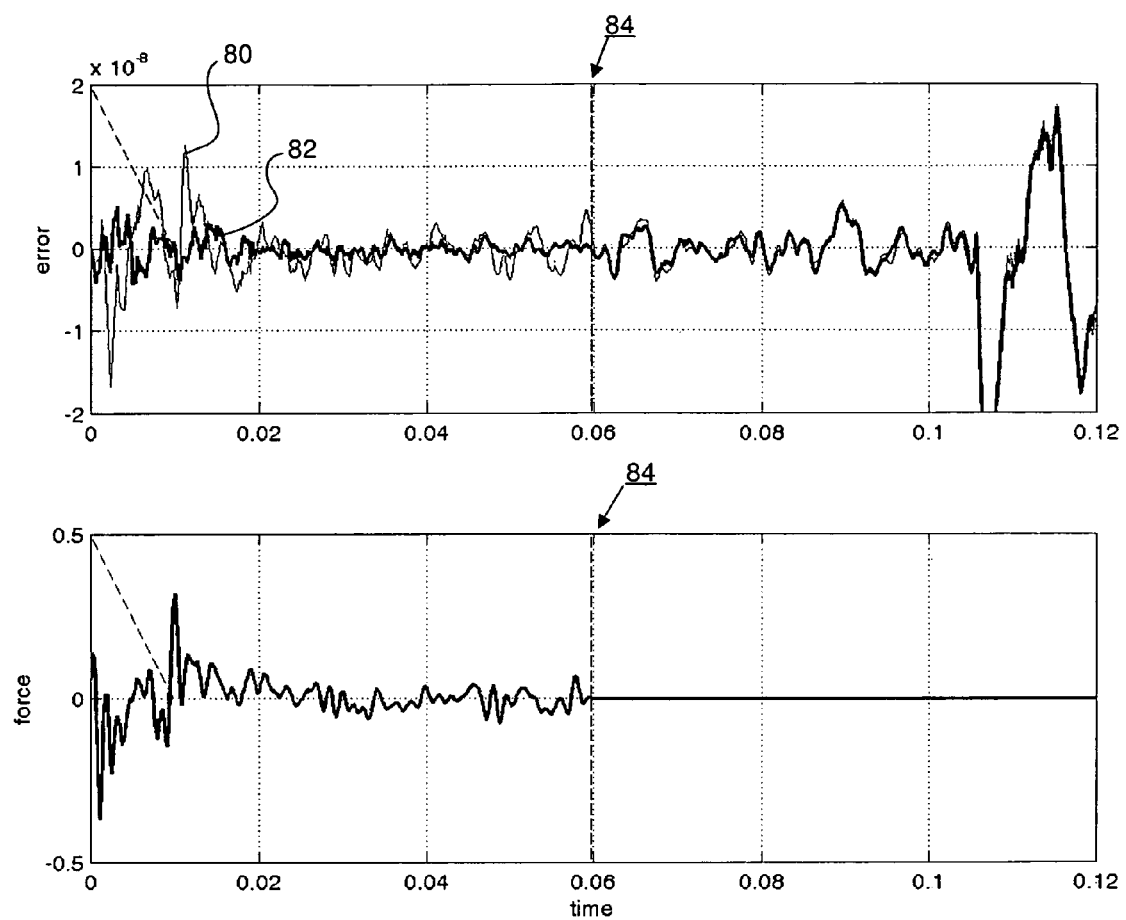
FIG. 8 depicts error signals resulting from a feedforward control system using feedforward data segments corresponding to the jerk/djerk phase and part of the corresponding constant velocity regions.

In another embodiment, instead of the entire acceleration phase being used and subsequently stored for learning, merely the jerk/djerk phase and part of the corresponding constant velocity regions are used. For the jerk phase, i.e. the first entry in the library of learned feedforward data, this is shown in FIG. 8. The uppermost graph represents a plot of error against time: the thinner line 80 represents the error before learning and the thicker line 82 represents the (improved) error achieved using learned feedforward data. The lowermost graph shows the variation of learned feedforward data (also referred to as a corrective "force") with time. After the transition point 84, no learned feedforward data is available and it can be seen that the error curves 80 and 82 in the uppermost graph lie on top of each other thereafter. This embodiment is capable of dealing with velocity variations since merely the jerk/djerk phases are considered and not the constant acceleration phase in between (which may therefore be made longer or shorter while still being amenable to feedforward data segments based on the jerk/djerk phases).

Embodiments of the present invention may be applied in the field of lithographic motion systems like the control of reticle stages or substrate tables, as mentioned above. The system may also be used in stages for electron microscope imaging, MagLev stages for laser cutting, or repetitive motion systems in a more general perspective. Other fields of application include, for example, UHP-lamp control where an iterative learning control scheme as previously been introduced.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

Although specific reference may have been made above to the use of embodiments of the invention in the context of optical lithography, it will be appreciated that the invention may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used herein encompass all types of electromagnetic radiation, including ultraviolet (UV) radiation (e.g. having a wavelength of or about 365, 355, 248, 193, 157 or 126 nm) and extreme ultra-violet (EUV) radiation (e.g. having a wavelength in the range of 5-20 nm), as well as particle beams, such as ion beams or electron beams.

The term "lens", where the context allows, may refer to any one or combination of various types of optical components, including refractive, reflective, magnetic, electromagnetic and electrostatic optical components.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below.

What is claimed is:

1. A system configured to move a component in accordance with a setpoint profile that includes a plurality of target states of said component, each of said plurality of target states to be substantially attained at one of a corresponding sequence of target times, said system comprising:
    a displacement device configured to move said component according to said setpoint profile;
    a data storage device that includes a library of feedforward data;
    a signal generator configured to (a) identify a plurality of time segments of said setpoint profile that correspond to entries in said library of feedforward data, and (b) access said entries in order to construct a feedforward signal; and
    a feedforward control system configured to control said displacement device based on said feedforward signal that is constructed by said signal generator.

2. A system according to claim 1, wherein said plurality of target states include at least one of target positions of said component, target velocities of said component, and target accelerations of said component.

3. A system according to claim 1, wherein said signal generator comprises:
    a trigger detection system configured to detect segments of said setpoint profile that correspond to entries in said library of feedforward data; and
    an input device configured to insert the entries into said feedforward signal when a corresponding segment is detected by said trigger detection system.

4. A system according to claim 1, wherein said entries in said library include feedforward data for at least one of the following types of setpoint profile segment: a constant velocity profile, a constant acceleration profile, a constant deceleration profile, a jerk phase, a djerk phase, and profiles characterized by finite values of higher order derivatives of position with respect to time.

5. A system according to claim 1, wherein at least a subset of said entries in said library are based on previous calibration measurements.

6. A system according to claim 5, wherein said calibration measurements comprise iteratively learnt data.

7. A lithographic projection apparatus arranged to project a pattern from a patterning device onto a substrate, comprising:
    (a) a movable support configured to hold said patterning device; and
    (b) a system configured to move said movable support in accordance with a setpoint profile that includes a plurality of target states of said movable support, each of said plurality of target states to be substantially attained at one of a corresponding sequence of target times, said system comprising
        (i) a displacement device configured to move said movable support according to said setpoint profile;
        (ii) a data storage device that includes a library of feedforward data;
        (iii) a signal generator configured to (1) identify a plurality of time segments of said setpoint profile that correspond to entries in said library of feedforward data, and (2) access said entries in order to construct a feedforward signal; and (iv) a feedforward control system configured to control said displacement device based on said feedforward signal that is constructed by said signal generator.

8. A lithographic projection apparatus arranged to project a pattern from a patterning device onto a substrate, comprising:
  (a) a movable support configured to hold said substrate; and
  (b) a system configured to move said movable support in accordance with a setpoint profile that includes a plurality of target states of said movable support, each of said plurality of target states to be substantially attained at one of a corresponding sequence of target times, said system comprising
    (i) a displacement device configured to move said movable support according to said setpoint profile;
    (ii) a data storage device that includes a library of feedforward data;
    (iii) a signal generator configured to (1) identify a plurality of time segments of said setpoint profile that correspond to entries in said library of feedforward data, and (2) access said entries in order to construct a feedforward signal; and
    (iv) a feedforward control system configured to control said displacement device based on said feedforward signal that is constructed by said signal generator.

9. A method of moving a component in accordance with a setpoint profile that includes a plurality of target states of said component, each of said plurality of target states to be substantially attained at one of a corresponding sequence of target times, said method comprising:
  comparing a plurality of time segments of said setpoint profile with entries in a library of feedforward data;
  identifying time segments for which feedforward data exist in said library;
  retrieving the feedforward data for the identified time segments;
  constructing at least part of a feedforward signal using said retrieved feedforward data; and
  controlling a movement of said component according to said setpoint profile based on said feedforward signal.

10. A method according to claim 9, wherein at least a subset of said entries in said library are based on previous calibration measurements.

11. A method according to claim 10, wherein said calibration measurements are obtained by:
  moving said component according to a setpoint profile time segment using a feedforward signal;
  measuring a state of said component during said movement and determining a difference between said measured state and a corresponding target state of said component defined by said setpoint profile;
  refining said feedforward signal according to said difference;
  repeating said moving, measuring and refining until said difference is below a target threshold; and
  storing the refined feedforward signal in said library of feedforward data in correspondence with the associated setpoint profile time segment.

12. A device manufacturing method comprising:
  (a) projecting a pattern from a patterning device onto a substrate; and
  (b) moving a movable support that is configured to hold said patterning device in accordance with a setpoint profile that includes a plurality of target states of said movable support, each of said plurality of target states to be substantially attained at one of a corresponding sequence of target times, said moving comprising
    (i) comparing a plurality of time segments of said setpoint profile with entries in a library of feedforward data;
    (ii) identifying time segments for which feedforward data exists in said library;
    (iii) retrieving the feedforward data for the identified time segments;
    (iv) constructing at least part of a feedforward signal using said retrieved feedforward data; and
    (v) controlling a movement of said movable support according to said setpoint profile based on said feedforward signal.

13. A device manufacturing method comprising:
  (a) projecting a pattern from a patterning device onto a substrate; and
  (b) moving a movable support configured to hold said substrate in accordance with a setpoint profile that includes a plurality of target states of said movable support, each of said plurality of target states to be substantially attained at one of a corresponding sequence of target times, said moving comprising
    (i) comparing a plurality of time segments of said setpoint profile with entries in a library of feedforward data;
    (ii) identifying time segments for which feedforward data exists in said library;
    (iii) retrieving the feedforward data for the identified time segments;
    (iv) constructing at least part of a feedforward signal using said retrieved feedforward data; and
    (v) controlling the movement of said movable support according to said setpoint profile based on said feedforward signal.

14. A system according to claim 1, wherein the feedforward data are used to control movement of the component.

* * * * *